United States Patent [19]

Angermaier et al.

[11] Patent Number: 5,505,087
[45] Date of Patent: Apr. 9, 1996

[54] METHOD FOR COMBUSTION MISFIRE DETECTION WITH BAD ROAD DETECTION

[75] Inventors: Anton Angermaier, Landshut; Manfred Wier, Wenzenbach, both of Germany

[73] Assignee: Siemens Aktiengesellschaft, Munich, Germany

[21] Appl. No.: 233,509

[22] Filed: Apr. 26, 1994

[30] Foreign Application Priority Data

Apr. 27, 1993 [EP] European Pat. Off. .............. 93106830

[51] Int. Cl.⁶ .................................................. G01M 15/00
[52] U.S. Cl. .......................................... 73/117.3; 123/419
[58] Field of Search ........................ 73/105, 116, 117.3; 123/419, 436

[56] References Cited

U.S. PATENT DOCUMENTS

| | | | |
|---|---|---|---|
| 4,651,290 | 3/1987 | Masaki et al. | 73/105 |
| 4,809,197 | 2/1989 | Tashiro et al. | 73/105 |
| 4,837,727 | 6/1989 | Tashiro et al. | 73/105 |
| 4,912,967 | 4/1990 | Shiraishi et al. | 73/105 |
| 4,930,479 | 6/1990 | Osawa et al. | 123/436 |
| 5,044,194 | 9/1991 | James et al. | 73/117.3 |
| 5,044,195 | 9/1991 | James et al. | 73/117.3 |
| 5,141,246 | 8/1992 | Nakaniwa | 280/707 |

FOREIGN PATENT DOCUMENTS

| | | |
|---|---|---|
| 0366384 | 5/1990 | European Pat. Off. . |
| 0497475 | 8/1992 | European Pat. Off. . |
| 2682718 | 4/1993 | France . |
| 4200752 | 9/1992 | Germany . |
| 2251949 | 7/1992 | United Kingdom . |

OTHER PUBLICATIONS

"Methods of On–Board Misfire Detection", Plapp et al. Robert Bosch GmbH, 1990, pp. 9–20.
Japanese Patent Abstract No. 4072450 (Shinpei), Mar. 6, 1992.
Japanese Patent Abstract No. 5010199 (Yasutoshi et al.) May 31, 1993.

*Primary Examiner*—Richard Chilcot
*Assistant Examiner*—Eric S. McCall
*Attorney, Agent, or Firm*—Herbert L. Lerner; Laurence A. Greenberg

[57] ABSTRACT

A method for detecting combustion misfires in internal combustion engines includes calculating a non-concentricity value from fluctuations in angular speed of a crankshaft, and dropping the non-concentricity value below a negative non-concentricity limit value if a combustion misfire is present. If the non-concentricity value drops below the non-concentricity limit value, a value for a stretch of bad road is calculated from successively calculated non-concentricity values, and the value for a stretch of bad road is dropped below or made of equal magnitude to a positive limit value for a stretch of bad road, if a stretch of bad road is present. The previously indicated combustion misfire is not confirmed if the value for a stretch of bad road drops below or is of equal magnitude to the limit value for a stretch of bad road. However, the previously indicated combustion misfire is confirmed if the value for a stretch of bad road exceeds the limit value for a stretch of bad road.

11 Claims, 1 Drawing Sheet

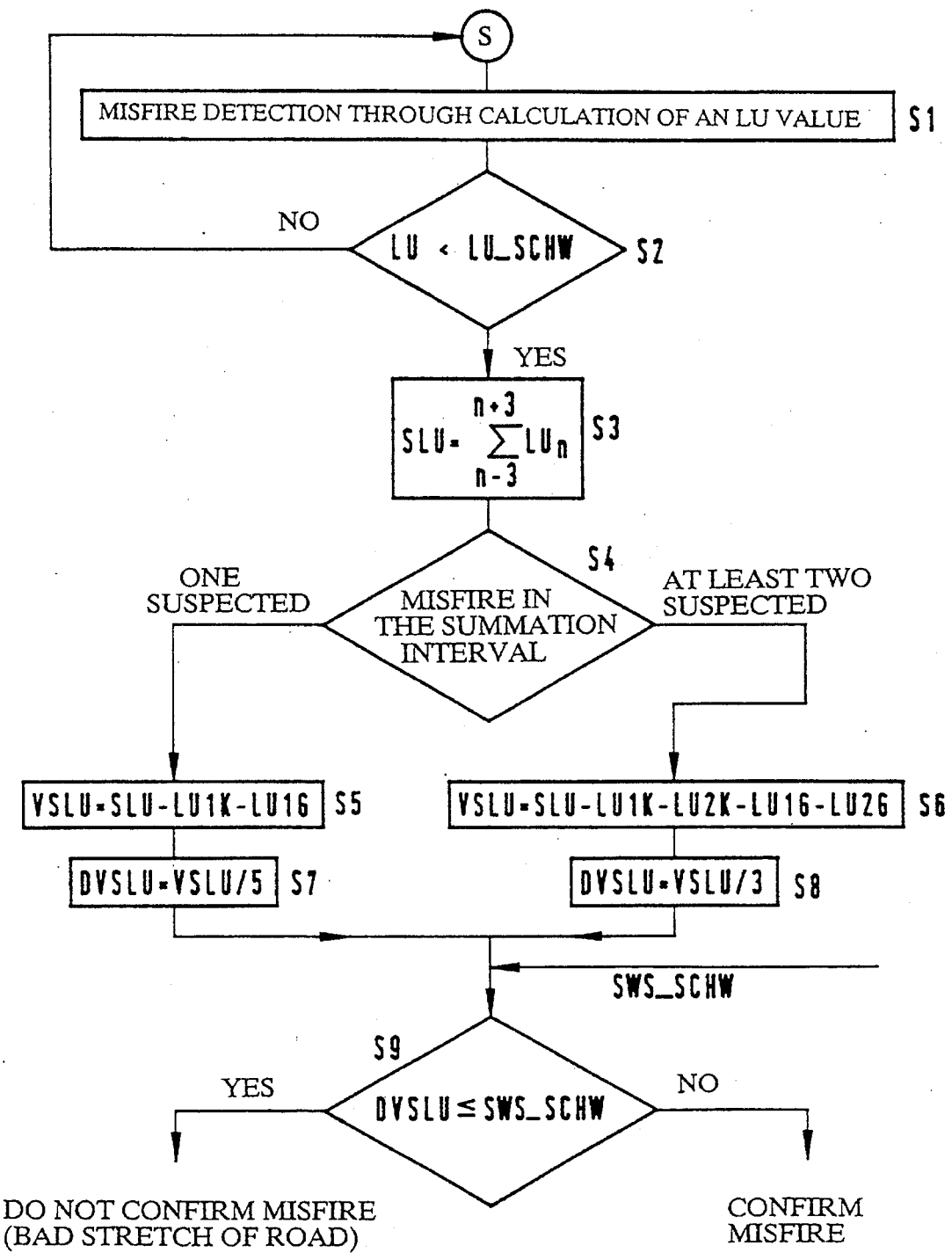

METHOD FOR COMBUSTION MISFIRE DETECTION WITH BAD ROAD DETECTION

BACKGROUND OF THE INVENTION

Field of the Invention

The invention relates to a method for detecting combustion misfires in internal combustion engines, in which a crankshaft speed is evaluated and an influence of stretches of bad road is taken into account.

Combustion misfires in internal combustion engines that have an exhaust gas catalytic converter downstream of the engine can cause damage to the catalytic converter, because high temperatures arise from after-reactions of the uncombusted fuel-air mixture in the catalytic converter. Moreover, combustion misfires also worsen the quality of the exhaust gas.

In order to detect a combustion misfire, a method that measures the instantaneous angular speed of the crankshaft is employed in the present invention.

Such a method is known, for instance, from Published European Application No. 92 111 078.9, corresponding to U.S. application Ser. No. 08/085,351, filed Jun. 30, 1993, which includes the inventors of the instant application. A combustion misfire causes temporary slowing down of the angular speed, which is detected by measuring the periods of time (segment times) during which the crankshaft rotates about a defined angular span.

Those measured times are not used directly. Instead, so-called non-concentricity values are calculated from them, in which various dynamic factors that arise during engine operation (acceleration, deceleration) are compensated for, depending on the method being used. These non-concentricity values are then compared with limit values in order to detect combustion misfires.

In methods in which the non-concentricity caused by the combustion misfire is evaluated, the danger of misdetection exists when the vehicle is traveling over stretches of bad road. The crankshaft may be set into vibration through the drive train. The resultant angular accelerations of the crankshaft can even exceed the values that occur in a combustion misfire. That can cause misdetection.

Such instances of misdetection can be prevented by blanking out the combustion misfire detection when a stretch of bad road appears.

In previously known methods for detecting stretches of bad road, the acceleration of the vehicle body is checked. However, that requires an expensive acceleration sensor.

In order to detect stretches of bad road, the wheel rpm can also be monitored for acceleration values that are higher than the accelerations which are possible with the engine in a particular vehicle. Such high acceleration values then lead to the conclusion of a poor stretch of road.

However, such a method is commercially useful only where such wheel rpm sensors are already present, or in other words in vehicles with an ABS system.

SUMMARY OF THE INVENTION

It is accordingly an object of the invention to provide a method for enabling combustion misfire detection while taking the influence of stretches of bad road into account, which overcomes the hereinafore-mentioned disadvantages of the heretofore-known methods of this general type and which does so without requiring additional hardware expenditure for that purpose.

With the foregoing and other objects in view there is provided, in accordance with the invention, a method for detecting combustion misfires in internal combustion engines, which comprises calculating a non-concentricity value from fluctuations in angular speed of a crankshaft, and dropping the non-concentricity value below a negative non-concentricity limit value if a .combustion misfire is present; and if the non-concentricity value drops below the non-concentricity limit value, calculating a value for a stretch of bad road from successively calculated non-concentricity values, dropping the value for a stretch of bad road below or making the value for a stretch of bad road of equal magnitude to, a positive limit value for a stretch of bad road, if a stretch of bad road is present, and not confirming the previously indicated combustion misfire if the value for a stretch of bad road drops below the limit value for a stretch of bad road or is of equal magnitude to the limit value for a stretch of bad road, but confirming the previously indicated combustion misfire if the value for a stretch of bad road exceeds the limit value for a stretch of bad road.

A distinction is made from the appearance of the segment time fluctuations, as to whether a combustion misfire is actually present, or whether the fluctuations can be ascribed to the influence of a stretch of bad road. This method makes do without additional hardware.

When a detection method is employed in which the non-concentricity values become negative (drop below a negative limit value) when a systematic combustion misfire is actually present, the non-concentricity values of the cylinders that are not misfires are unequivocally within the positive range. In a detection method with positive non-concentricity values when a combustion misfire is occurring, the non-concentricity values of the cylinders that are not misfires are then correspondingly unequivocally within the negative range. Conversely, when stretches of bad road are involved, the distribution of non-concentricity values is virtually uniform around the zero position. Since the non-concentricity values are also in the vicinity of the zero position during normal engine operation without combustion misfires, the check for whether or not a stretch of bad road is involved is not activated until a combustion misfire is indicated. If a stretch of bad road is not diagnosed in that case, then the combustion misfire is confirmed.

In accordance with another mode of the invention, there is provided a method which comprises calculating the value for a stretch of bad road by adding together successively calculated non-concentricity values to form a sum; reducing the sum by a largest and a smallest of the non-concentricity values occurring during a measurement interval, if a combustion misfire was indicated during the measurement interval, and further reducing the sum by a second-largest and a second-smallest of the non-concentricity values occurring during the measurement interval, if at least two combustion misfires were indicated during the measurement interval; and calculating a mean value from the reduced sum.

In accordance with a further mode of the invention, there is provided a method which comprises setting a number of non-concentricity values to be added together as being equivalent to a number of cylinders.

In accordance with an added mode of the invention, there is provided a method which comprises taking the non-concentricity limit value from a performance graph being dependent on operating variables including at least load and rpm, as a function of current engine operating positions.

In accordance with an additional mode of the invention, there is provided a method which comprises taking the limit value for a stretch of bad road from a performance graph being dependent on operating variables including at least load and rpm, as a function of current engine operating positions.

In accordance with yet another mode of the invention, there is provided a method which comprises calculating the limit value for a stretch of bad road from the non-concentricity limit value.

In accordance with yet a further mode of the invention, there is provided a method which comprises calculating the limit value for a stretch of bad road from the non-concentricity limit value by multiplication by a factor which is preferably in a range of from 0 to −1.

In accordance with yet an added mode of the invention, there is provided a method which comprises subjecting the value for a stretch of bad road to sliding averaging.

In accordance with a concomitant mode of the invention, there is provided a method which comprises carrying out the method only below a predeterminable engine rpm.

Other features which are considered as characteristic for the invention are set forth in the appended claims.

Although the invention is illustrated and described herein as embodied in a method for combustion misfire detection with bad road detection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with accompanying drawing.

BRIEF DESCRIPTION OF THE DRAWING

The FIGURE is a flow chart illustrating the steps of the method of the invention.

DESCRIPTION OF THE PREFERRED EMBODIMENTS

Referring now to the single FIGURE of the drawing in detail, there is firstly seen a method step S1 in which a combustion misfire detection is carried out, through an arbitrary method which evaluates non-concentricity of the crankshaft. A non-concentricity value LU is calculated. In the exemplary embodiment that follows it is assumed that whenever there is no combustion misfire, the non-concentricity value will be above a negative limit value, and when a combustion misfire is occurring, the non-concentricity value will drop below this negative limit value.

In a method step S2, this non-concentricity value LU is compared with a non-concentricity limit value LU_SCHW. The limit value is taken from a performance graph, for instance as a function of the load and the rpm for the current operating point of the engine.

If the non-concentricity value LU is greater than or equal to the limit value LU_SCHW, then no combustion misfire is occurring, and a return is made back to the start S of the method.

However, if the non-concentricity value LU is less than the limit value, then combustion misfire is suspected, and a jump is then made to a method step S3. A check is then made as to whether the indicated combustion misfire is in fact a combustion misfire, or whether this negative non-concentricity value is due to the feedback of a bad stretch of road on the crankshaft.

To that end, in the method step S3, a sum or total SLU of the non-concentricity values over a selectable measurement interval, which in this example is over a scanning time n−3 to n+3, is formed. The size of the measurement interval is dependent on the number of cylinders and on the desired accuracy.

The above-described method or some other arbitrary method for combustion misfire detection ascertains how many combustion misfires are suspected to have occurred during the above measurement interval. Depending on the findings, in a method step S4 a jump is made to a method step S5 if one misfire is present and to a method step S6 if at least two suspected misfires are present.

In another embodiment of the method, the right-hand side of the diagram may be omitted. In other words, further calculation may be performed as shown in this case for method steps S5 and S7, regardless of the number of combustion misfires.

In a method step S5 or S6, in order to provide a reduced sum (VSLU), the total SLU of non-concentricity values is reduced by the smallest non-concentricity value LU1K and the largest non-concentricity value LU1G that have occurred during the measurement interval, or in the case of two or more misfires, as is shown for the method step S6, it is also reduced by the second-smallest non-concentricity value LU2K and the second-largest non-concentricity value LU2G that have also occurred during that interval.

Then in a method step S7 or S8, by averaging, a so-called value DVSLU for a stretch of bad road is formed.

In a method step S9, this value DVSLU for a stretch of bad road is compared with a limit value for a stretch of bad road SWS_SCHW.

This limit value SWS_SCHW for a stretch of bad road is either taken from a performance graph as a function of load and rpm or derived from the aforementioned non-concentricity limit value LU_SCHW. It has been found reliable in practice to multiply the non-concentricity limit value LU_SCHW by a factor of −1 and 0 in order to obtain the limit value SWS_SCHW for a stretch of bad road.

It is also possible for the value DVSLU for a stretch of bad road to be subjected to sliding averaging as well.

If the value DVSLU for a stretch of bad road is less than or equal to the limit value SWS_SCHW, then a stretch of bad road is present and the combustion misfire is not confirmed. However, if the value DVSLU for a stretch of bad road is greater than the limit value, then a stretch of bad road is not present, and the combustion misfire is confirmed.

We claim:

1. A method for detecting combustion misfires in internal combustion engines, which comprises:

first calculating a non-concentricity value from fluctuations in angular speed of a crankshaft, and dropping the non-concentricity value below a negative non-concentricity limit value if a combustion misfire is present; and if the non-concentricity value drops below the non-concentricity limit value:

calculating a value for a stretch of bad road from non-concentricity values successively calculated in the first calculating step, dropping the value for a stretch of bad road below or making the value for a stretch of bad road of equal magnitude to, a positive limit value for a stretch of bad road, if a stretch of bad road is present, and not confirming the previously indicated combustion misfire if the value for a stretch of bad road drops below the limit value for a stretch of bad road or is of equal magnitude to the limit value for a stretch of bad road, but confirming the previously indicated combustion misfire if the value for a stretch of bad road exceeds the limit value for a stretch of bad road.

2. The method according to claim 1, which comprises calculating the value for a stretch of bad road by:

adding together successively calculated non-concentricity values to form a sum;

reducing the sum by a largest and a smallest of the non-concentricity values occurring during a measurement interval, if a combustion misfire was indicated during the measurement interval, and further reducing the sum by a second-largest and a second-smallest of the non-concentricity values occurring during the measurement interval, if at least two combustion misfires were indicated during the measurement interval; and calculating a mean value from the reduced sum.

3. The method according to claim 2, which comprises setting a number of non-concentricity values to be added together as being equivalent to a number of cylinders.

4. The method according to claim 1, which comprises taking the non-concentricity limit value from a performance graph being dependent on operating variables including at least load and rpm, as a function of current engine operating positions.

5. The method according to claim 1, which comprises taking the limit value for a stretch of bad road from a performance graph being dependent on operating variables including at least load and rpm, as a function of current engine operating positions.

6. The method according to claim 1, which comprises calculating the limit value for a stretch of bad road from the non-concentricity limit value.

7. The method according to claim 6, which comprises calculating the limit value for a stretch of bad road from the non-concentricity limit value by multiplication by a factor.

8. The method according to claim 7, which comprises setting the factor in a range of from 0 to −1.

9. The method according to claim 1, which comprises subjecting the value for a stretch of bad road to sliding averaging.

10. The method according to claim 1, which comprises carrying out the method only below a predeterminable engine rpm.

11. A method for detecting combustion misfires in internal combustion engines, which comprises:

first calculating a non-concentricity value from fluctuations in angular speed of a crankshaft, and dropping the non-concentricity value below a negative non-concentricity limit value if a combustion misfire is present; and if the non-concentricity value drops below the non-concentricity limit value:

calculating a value for a stretch of bad road from non-concentricity values successively calculated in the first calculating step, making the value for a stretch of bad road less or equal to a positive limit value for a stretch of bad road, if a stretch of bad road is present, and not confirming the previously indicated combustion misfire if the value for a stretch of bad road is less than or equal to the limit value for a stretch of bad road, but confirming the previously indicated combustion misfire if the value for a stretch of bad road exceeds the limit value for a stretch of bad road.

* * * * *